3,029,215
COPOLYMERS OF 4-METHYL-1-PENTENE AND 1-OLEFINS
Tod W. Campbell, Wilmington, Del., assignor to E. I. du Pont de Nemours and Company, Wilmington, Del., a corporation of Delaware
No Drawing. Filed Nov. 30, 1956, Ser. No. 625,220
13 Claims. (Cl. 260—33.6)

The present invention relates to isotactic copolymers from 4-methyl-1-pentene. More specifically it relates to soluble copolymers of 4-methyl-1-pentene with linear 1-olefins, soluble enough to allow the preparation of spinning solutions, and to soluble cross-linkable terpolymers.

Poly(4-methyl-1-pentene) has been described before, but the polymer was found to be too insoluble for dry spinning, and the melting point too high for melt extrusion. This insolubility and high melting point of poly-(4-methyl-1-pentene) is attributable largely to the high molecular weight and the crystallinity of the polymer. These two factors, on the other hand, in addition to its high resistance against attack by chemical reagents and microorganisms, make the polymer very desirable and potentially useful, and means to shape it readily into fine structures have been sought ever since the polymer has been known.

It is, therefore, an object of the present invention to provide soluble isotactic hydrocarbon copolymers from 4-methyl-1-pentene. Another object is the preparation of such an isotactic hydrocarbon copolymer, suitable for dry spinning. A further object is the preparation of a solution of a copolymer of 4-methyl-1-pentene in such a way that the solution can be dry-spun to produce filamentary materials. A still further object is the provision of a cross-link isotactic terpolymer from 4-methyl-1-pentene, a 1-olefin, and divinylbenzene.

These and other objects are accomplished by copolymerizing a mixture of 75% to 90% of 4-methyl-1-pentene and from about 10% to 25% of a 1-olefin in an appropriate solvent to give highly viscous solutions which can be dry-spun directly without isolation of the polymer or removal of the polymerization catalyst. Such copolymers which also contain small amounts, i.e., from 0.5 to 10% of divinylbenzene in the monomeric mixture can easily be insolubilized at elevated temperatures. A technical grade of divinylbenzene containing mostly 1,4-divinylbenzene together with small amounts of other divinylbenzenes has been found satisfactory.

The present invention is more clearly understood by reference to the following examples which are illustrative only and not meant to be limitative in any respect. It is to be understood that any 1-olefin having at least 5 carbon atoms may be substituted in like amount directly in the examples to give comparable soluble polymers. These olefins may be represented by the formula:

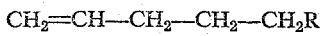

$CH_2=CH-CH_2-CH_2-CH_2R$ where R stands for hydrogen or any hydrocarbon radical. These may be linear, branched, alicyclic, aromatic, aliphatic/aromatic or aliphatic/alicyclic with no limitation as to the number of carbon atoms in the group.

In the examples the inherent viscosities were all measured in decahydronaphthalene as a 0.1% solution at 130° C. in the presence of a suitable antioxidant and the reactions carried out at room temperature unless stated otherwise.

Example I 0.76 gram lithium aluminum hydride was heated at 150° C. with 15 cc. of 1-decene in a nitrogen atmosphere. After 1 hour the formation of lithium aluminum tetradecyl was completed. The mixture was cooled to room temperature and 100 cc. of cyclohexane was added. The temperature was then lowered to 0° C. and 1.5 cc. of pure titanium tetrachloride was added with vigorous stirring, followed by the addition of 100 cc. of cyclohexane. The cooling bath was then removed and a mixture of 40 cc. 4-methyl-1-pentene and 10 cc. 1-hexene was added. The polymerization was allowed to proceed at autogenous temperature and pressure and was very rapid. After 45 minutes, the blackish brown viscous solution was filtered with pressure and without isolation of the catalyst dry-spun through a 5-hole spinneret, with a hole diameter of 0.004 inch, at a head temperature of 75° C. and a column temperature ranging from 128–170° C. The 5-filament olive colored yarn was wound up at the rate of 250 feet per minute with a spin-stretch factor of 2.15. The resulting yarn was strong enough to be backwound and pin-drawn. The color imparted by the catalyst was removed by washing the yarn with isopropanol.

Example II

A mixture of 40 cc. 4-methyl-1-pentene and 10 cc. 1-hexene was copolymerized over a co-ordination-type catalyst, prepared in the manner described in Example I from 100 cc. of lithium aluminum tetradecyl, 1.77 cc. of undiluted titanium tetrachloride and 400 cc. cyclohexane. After 3 hours the copolymer was precipitated from the solution by the addition of isopropyl alcohol. The copolymer was washed repeatedly with alcohol and dried at 100° under a steam of nitrogen. A yield of 22 grams copolymer with an inherent viscosity of 2.08 was found. A sample of this copolymer was pressed into a film at 220° C., and the tough film stretch-drawn 6–8× over a hot pin at 125° C. The film strip was highly crystalline as shown by X-ray patterns, and it had a crystalline melting point of about 200° C.

This copolymer was soluble in cyclohexane up to 25% solids. These solutions were quite viscous and had none of the gel-like properties shown by very dilute solutions of the 4-methyl-1-pentene homopolymer. The solutions could be cast into clear, low modulus films or dry-spun to cold-drawable fibers.

A 13% solution of this copolymer in cyclohexane was concentrated to contain 20% solids, and dry-spun through a 5-hole, 0.004-inch diameter orifice at a head temperature of 75° C. and a column temperature range of 110–150° C. The yarn was wound up at 285 feet per minute with a spin-stretch factor of 2.3.

This experiment was repeated, but by starting with 20 cc. 1-hexene and 30 cc. 4-methyl-1-pentene: 21.0 g. of a copolymer of inherent viscosity 2.14 was obtained which was rubbery and could not be crystallized.

Example III 1.5 grams lithium aluminum hydride was heated in 30 cc. of 1-decene at 160° C. for 1 hour. After addition of 150 cc. cyclohexane, the mixture was cooled in ice. 3.0 cc. titanium tetrachloride were then added at 0° followed by an additional 100 cc. of cyclohexane. The cooling bath was removed and a mixture of 90 cc. 4-methyl-1-pentene and 10 cc. 1-hexene was added. After about 45 minutes, the catalyst was inactivated by the addition of 10 cc. tetrahydrofuran, and the very viscous solution was pressure filtered and dry-spun according to Example I. A wind-up speed of about 305 feet per minute was reached with a spin-stretch factor of 1.0. The yarn could easily be backwound and pin-drawn. A crystalline melting point of 205° C. was observed.

In a repetition of this example, the copolymer was precipitated by the addition of isopropyl alcohol and the dried material molded into a plug which was then extruded at 290° C. through a 0.015-inch diameter orifice. The resulting fiber was drawn 8× at 140° C. and the following properties were measured:

|  | Tenacity, g.p.d. | Elongation, percent | Initial Modulus, g.p.d. |
|---|---|---|---|
| regular loop knot 90° C., wet | 1.5 | 32 | 7.5 |
|  | 0.98 | 26 | 4.8 |
|  | 1.1 | 33 | 3.1 |
|  | 0.5 | 100 | 0.8 |

*Example IV*

In a 500-cc., 3-necked flask 100 cc. lithium aluminum tetradecyl was placed under nitrogen. The flask was cooled in an ice-salt bath for approximately 15 minutes before 2.2 cc. of pure titanium tetrachloride was added. The cooling bath was removed and the catalyst solution diluted with 100 C. cyclohexane. To this catalyst suspension a mixture of 40 cc. 4-methyl-1-pentene, 10 cc. 1-hexene, and 10 cc. divinylbenzene was added. The polymerization was exothermic and was controlled by external cooling with tap water. After 1 hour the polymer was isolated by precipitation with alcohol, and filtered. It was washed repeatedly with alcohol and dried. The yield of this terpolymer was 18 grams and an inherent viscosity of 2.69 was measured.

The dry terpolymer could be dissolved in cyclohexane to a 15% solution which was cast into a very tough film with fairly low modulus or wet-spun into methanol. The polymer remains soluble in cyclohexane until heated, for example, at 225° C. for 10 minutes. After heating, a film was somewhat stiffer and completely insoluble in cyclohexane, but retained most of the original toughness.

*Example V*

250 cc. lithium aluminum tetradecyl was placed in a two-liter resin kettle and cooled in an ice-salt bath under nitrogen. After 10 minutes, 5.0 cc. undiluted titanium tetrachloride was added and the mixture stirred for an additional 5 minutes. The ice bath was removed and a mixture of 212 cc. 4-methyl-1-pentene and 38 cc. 1-pentene was added. After 24 hours the reaction mixture was worked up in a Waring Blendor with alcohol, filtered and washed with additional alcohol. A copolymer of inherent viscosity 2.97 was obtained in good yields. It was soluble in hot cyclohexane, hot chloroform, hot xylene, and hot carbon tetrachloride, but these solutions gelled on cooling.

The copolymer was pressed into film samples at 235° C., which could be drawn 6× at 150° C. over a hot pin. X-ray pictures showed high crystallinity and orientation.

About 20 grams of this copolymer was molded into a plug and melt-spun through a 0.015-inch diameter orifice at 240° C. and drawn 5.75× at 150° C. The fiber had a tenacity of 1.1 g.p.d., an elongation of 24%, a modulus of 89 g.p.d., a work recovery of 24% at 3% elongation and a tensile recovery of 61% at 5% elongation.

*Example VI*

A mixture of 0.76 gram lithium aluminum hydride and 15 cc. 1-decene was heated to 160° C. for 90 minutes, subsequently cooled to room temperature, and 100 cc. cyclohexane added. The solution was cooled to 0°, and 1.5 cc. titanium tetrachloride was added, followed by an additional 100 cc. cyclohexane. In this catalyst, 40 cc. 4-methyl-1-pentene and 10 cc. 1-octene was polymerized at autogenous pressure and temperature. After 2 hours, the polymer was isolated by precipitation with alcohol and was obtained in a good yield with an inherent viscosity of 1.95. It was easily soluble in cold cyclohexane and cold carbon tetrachloride, and moderately soluble in cold chloroform. It was easily soluble in hot chloroform, hot tetrahydrofuran and hot xylene.

Film samples were pressed at 235° C. and the strips were drawn at 150° C. Again the film strips showed high X-ray crystallinity but no birefringence at room temperature. Birefringence developed on annealing at 100-120° C. The product showed a final crystalline melting point of 188° C.

The polymer was also melt-spun at 220° C.

*Example VII*

A mixture of 212 cc. 4-methyl-1-pentene and 38 cc. 1-octadecene was polymerized in the same fashion as in the preceding experiments. The yield of polymer with an inherent viscosity of 2.08 was good. The copolymer was moderately soluble at room temperature in cyclohexane, chloroform, and carbon tetrachloride. It was easily soluble at the boiling point in cyclohexane, chloroform, carbon tetrachloride, tetrahydrofuran, and xylene.

Film samples were prepared by pressing the polymer at 235° C. The film strips were drawn about 8× at 150° C. These film strips again showed no birefringence when observed with a polarizing microscope at room temperature. However, birefringence developed on annealing and a crystalline melting point of 182° C. was observed.

30 grams of this copolymer were dissolved in 320 cc. of warm cyclohexane to give a spinning solution of about 10-11% solids. This solution spun satisfactorily through a 5-hole spinneret with a hole diameter of 0.005 inch, a head temperature of 55-60° C., and a column temperature of 127-161° C. The fibers were strong enough to be backwound.

20 grams of the above copolymer were molded into a plug and melt-spun through a 0.015-inch diameter orifice at 210° C. The fiber could be drawn 8-10× at 100° C., and had the following properties.

| | |
|---|---|
| Tenacity | 1.0 g.p.d. |
| Elongation | 30%. |
| Initial modulus | 4.6 g.p.d. |
| Work recovery at 3% elongation | 38%. |
| Tensile recovery at 5% elongation | 67%. |
| Flex life of fiber | Approx. 13,000 cycles. |

*Example VIII*

100 cc. of lithium aluminum tetradecyl was mixed at room temperature with vigorous stirring with 1.7 cc. of titanium tetrachloride dissolved in 25 cc. of cyclohexane. 400 cc. of cyclohexane was then added, followed by a mixture of 35 cc. of 4-methyl-1-pentene and 15 cc. of 6-methyl-1-heptene. Polymerization was allowed to proceed for three hours when the polymer was isolated by precipitation with alcohol in a Waring Blendor. The yield of polymer after drying was 24 grams with an inherent viscosity of 2.5 in cyclohexane at room temperature. The polymer could be pressed into a clear, tough film at 200° C. in a Carver press. Strips of this film were drawn 6-8× over a hot pin at 125° C. These strips showed a crystalline melting point of about 180° C. The polymer was soluble in cyclohexane, chloroform and carbon tetrachloride.

In the above examples it has been demonstrated that 4-methyl-1-pentene can be polymerized with linear, branched, alicyclic, aromatic, aliphatic/aromatic, or aliphatic/alicyclic 1-olefins having at least 5 carbon atoms to give soluble copolymers. The ratio between 4-methyl-1-pentene and 1-olefin is limited by the solubility and crystallinity of the formed copolymer. Thus, a mixture of the above two monomers with more than about 25% 1-olefins yields a rubbery, non-crystalline copolymer, whereas a mixture of the above two components containing more than about 90% 4-methyl-1-pentene yields an insoluble copolymer, obviously not suitable for dry spinning. A relatively insoluble product is also obtained, when 4-methyl-1-pentene is copolymerized with a linear 1-olefin with less than 5 carbon atoms.

Branched 1-olefins can also be used to copolymerize with 4-methyl-1-pentene. However, the branching has to be at least 3 carbon atoms away from the double bond to produce a soluble, crystalline, isotactic product. The following typical 1-olefins are suitable for forming soluble copolymers with 4-methyl-1-pentene: 1-hexene, 1-heptene, 1-octene, 5-cyclohexyl-1-pentene, 6-methyl-1-octene, 6-ethyl-1-octene, 5-cyclohexyl-1-pentene, 5-phenyl-1-pentene, etc. These 1-olefins as well as any other falling within the definition given above may be used alone or in mixture instead of those given in the examples with comparable results.

The above copolymerization reaction can be carried out in a wide range of temperatures. This temperature range extends from well below 0° C. to above 200° C., in which latter case pressure has to be employed. The preferred temperature range, however, is from 0°–5° C., with an economically indicated temperature around room temperature. As described in the examples, the most economical way to prepare the copolymer is to add the mixture of the monomers to the catalyst and to copolymerize them at autogenous temperature and pressure. In this manner, the reaction is very fast and the copolymer is obtained readily after thirty minutes. However, the copolymerization can be carried out over a period of three or more hours before inactivating the catalyst or removing the copolymer from the reaction solution.

Similar co-ordination catalysts, of course, can also be used. Generally, such a catalyst can be made by combining certain metal compounds in which the cation is in a higher valance state than its lowest possible valence, with organo-metallic reducing agents, such as aluminum alkyls, Grignard's reagents, and lithium aluminum alkyls, thus converting the metal to one or more of its lower valence states where it becomes a highly active catalyst specifically for the polymerization of ethylenically unsaturated hydrocarbons. Among the cations producing the above type co-ordination catalysts are, besides titanium, the transition cations; namely, Zr, Ce, V, Nb, Ta, Cr, Mo, or W, or any combination thereof.

The copolymers of the present invention are generally soluble in chloroform, carbon tetrachloride, cyclohexane, benzene, toluene, xylene, chlorobenzene, tetrachloroethane, tetrahydrofuran, and a number of other similar (relatively non-polar) solvents. They are substantially insoluble in water, dimethylformamide, aniline, epichlorohydrin, dimethylaniline, dimethylacetamide, acetic acid, and other highly polar solvents.

The term soluble is intended to mean that the polymer is sufficiently soluble to form a viscous solution which can be spun into filaments. Usually about a 20% solution of the polymer or more is necessary.

The direct spinning of fibers from a polymerization mixture is economically very attractive since it obviates the necessity for isolating the polymer and freeing it of catalyst and thus should reduce markedly the overall cost of a fiber based on poly (4 methyl-1-pentene). This copolymer can easily be insolubilized by the addition of divinylbenzene to the copolymerization mixture and subsequently heating to cross-link the soluble copolymer formed after shaping it. Such a terpolymer is useful for the preparation of insoluble films and fibers based on an initially soluble copolymer.

The above copolymers are also very suitable for melt extrusion, and can be spun easily and smoothly through a 0.01-inch diameter or wider orifice at a temperature of around 250° C. to yield a uniform monofilament. This filament can be drawn up to 12 times its original as-spun length to yield a highly oriented fiber of good properties.

The very useful polymers can easily be shaped into fibers, films, rods, bristles, sheets, etc. Furthermore, the copolymers and terpolymers of the present invention have low density, are mildew resistant, resistant to microorganisms, resistant to acids and bases, yet of low cost, and can be used in the preparation of fish nets, tents, low cost shipping bags such as burlaps, tarpaulins, sails, tough ropes, floating cables, filter cloths for corrosive liquids at elevated temperature, seat covers, rain coats, etc. to name just a few of the various possibilities.

It will be apparent that many widely different embodiments of this invention may be made without departing from the spirit and scope thereof, and therefore it is not intended to be limited except as indicated in the appended claims.

I claim:
1. A fiber-forming crystalline copolymer capable of being formed into orientable shaped articles of from about 75% to 90% of 4-methyl-1-pentene and from about 10% to 25% of a 1-olefin having at least 5 carbon atoms, and having at least three —($CH_2$)— groups in a straight chain adjacent the double bond of said 1-olefin, said copolymer having been prepared from the indicated monomers in the presence of a catalyst consisting of the combination of a transition metal compound wherein the cation is in a higher valence state than its lowest possible valence and is selected from the group consisting of Zr, Ce, V, Nb, Ta, Cr, Mo, and W and an organometallic reducing agent, at a temperature within the range of from about 0° C. to about 200° C.

2. A viscous solution of the copolymer of claim 1 in a non-polar solvent selected from the group consisting of hydrocarbon and halogen-substituted hydrocarbon solvents.

3. The solution of claim 2 in which the copolymer is present in the amount of at least 20% based on the total weight of the solution.

4. The copolymer of claim 1 in the form of a film.
5. The copolymer of claim 1 in the form of a filament.
6. The copolymer of claim 1 in which the 1-olefin is 1-hexene.
7. The copolymer of claim 1 in which the 1-olefin is 1-decene.
8. The copolymer of claim 1 in which the 1-olefin is 1-octene.
9. The copolymer of claim 1 in which the 1-olefin is 1-pentene.

10. A crystalline copolymer of a monomeric mixture of from 75 to 90% of 4-methyl-1-pentene, from about 10 to 25% of a 1-olefin having at least 5 carbon atoms, and having at least three —($CH_2$)— groups in a straight chain adjacent the double bond of said 1-olefin and from about 0.5 to 10% divinylbenzene, said copolymer having been prepared from the indicated monomers in the presence of a catalyst consisting of the combination of a transition metal compound wherein the cation is in a higher valence state than its lowest possible valence and is selected from the group consisting of Zr, Ce, V, Nb, Ta, Cr, Mo, and W and an organometallic reducing agent, at a temperature within the range of from about 0° C. to about 200° C.

11. The crystalline terpolymer of a monomeric mixture of about 40 parts of 4-methyl-1-pentene, about 10 parts of a 1-olefin having at least 5 carbon atoms, and having at least three —($CH_2$)— groups in a straight chain adjacent the double bond of said 1-olefin and about 10 parts of divinylbenzene, said copolymer having been prepared from the indicated monomers in the presence of a catalyst consisting of the combination of a transition metal compound wherein the cation is in a higher valence state than its lowest possible valence and is selected from the group consisting of Zr, Ce, V, Nb, Ta, Cr, Mo and W and an organometallic reducing agent, at a temperature within the range of from about 0° C. to about 200° C.

12. A thermally cross-linked terpolymer of claim 10 in the form of a fiber.

13. A thermally cross-linked terpolymer of claim 10 in the form of a film.

(References on following page)

References Cited in the file of this patent

UNITED STATES PATENTS

| | | |
|---|---|---|
| 2,181,640 | Deanesly et al. | Nov. 28, 1939 |
| 2,683,138 | Goering et al. | July 6, 1954 |
| 2,825,721 | Hogan et al. | Mar. 4, 1958 |
| 2,908,669 | Hagemeyer et al. | Oct. 13, 1959 |
| 2,910,461 | Nowlin et al. | Oct. 27, 1959 |

FOREIGN PATENTS

| | | |
|---|---|---|
| 545,342 | Italy | June 30, 1956 |
| 549,891 | Belgium | July 28, 1956 |
| 538,782 | Belgium | Dec. 6, 1955 |